ND

(12) United States Patent
Yamada

(10) Patent No.: US 9,604,662 B2
(45) Date of Patent: Mar. 28, 2017

(54) STEERING APPARATUS

(71) Applicant: NSK Ltd., Shinagawa-ku, Tokyo (JP)

(72) Inventor: Jun Yamada, Maebashi (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 15/039,775

(22) PCT Filed: Jan. 27, 2015

(86) PCT No.: PCT/JP2015/052232
§ 371 (c)(1),
(2) Date: May 26, 2016

(87) PCT Pub. No.: WO2015/119000
PCT Pub. Date: Aug. 13, 2015

(65) Prior Publication Data
US 2017/0001657 A1   Jan. 5, 2017

(30) Foreign Application Priority Data

Feb. 5, 2014 (JP) ................................ 2014-020646
Apr. 11, 2014 (JP) ................................ 2014-082335

(51) Int. Cl.
*B62D 1/16* (2006.01)
*B62D 1/184* (2006.01)
(Continued)

(52) U.S. Cl.
CPC ............. *B62D 1/184* (2013.01); *B62D 1/185* (2013.01); *B62D 1/187* (2013.01); *B62D 5/0409* (2013.01)

(58) Field of Classification Search
USPC ........... 280/775, 777; 74/491, 492, 493, 495
See application file for complete search history.

(56) References Cited

U.S. PATENT DOCUMENTS

2012/0266715 A1* 10/2012 Okada .................... B62D 1/187
   74/493
2015/0027263 A1* 1/2015 Kern ...................... B62D 1/187
   74/495
(Continued)

FOREIGN PATENT DOCUMENTS

DE   102013107728 A1   7/2014
EP      1795425 A2     6/2007
JP    2009-090894 A    4/2009

OTHER PUBLICATIONS

International Search Report and Written Opinion for Application No. PCT/US2015/052232, Apr. 21, 2015, 9pgs.
(Continued)

*Primary Examiner* — Toan To
(74) *Attorney, Agent, or Firm* — Squire Patton Boggs (US) LLP

(57) ABSTRACT

A steering apparatus is provided which can sufficiently reduce backlash that may occur upon position adjustment of a steering wheel and the sounds from such backlash in a simple manner without affecting the operability of a turning lever.

A steering apparatus 1 is able to make tilt and telescopic position adjustment of a steering wheel H by moving a column 20 that holds a shaft of the steering wheel H relative to a vehicle body. The steering apparatus 1 has: a turning lever 123 for locking and unlocking the column 20 relative to the vehicle body; cams 120 and 121 that convert a turning movement of the turning lever 123 into a movement in the axial direction of the turning movement, thereby locking and unlocking the column 20; and a sleeve 122 that holds the cams 120 and 121 and slides with respect to the cams 120 and 121 when the turning lever 123 turns. Grease A is applied to a sliding surface between the sleeve 122 and the cams 120 and 121.

8 Claims, 18 Drawing Sheets

(51) Int. Cl.
   *B62D 5/04*    (2006.01)
   *B62D 1/185*   (2006.01)
   *B62D 1/187*   (2006.01)

(56) References Cited

U.S. PATENT DOCUMENTS

| | | | | |
|---|---|---|---|---|
| 2015/0360712 | A1* | 12/2015 | Baumeister | B62D 1/184 403/53 |
| 2015/0367878 | A1* | 12/2015 | Tanaka | B62D 1/184 74/493 |
| 2016/0107675 | A1* | 4/2016 | Yamada | B62D 1/184 74/493 |
| 2016/0107676 | A1* | 4/2016 | Kubota | B62D 1/184 74/495 |
| 2016/0144885 | A1* | 5/2016 | Tanaka | B62D 1/187 74/493 |

OTHER PUBLICATIONS

International Search Report and Written Opinion for Application No. PCT/JP2015/052232, Apr. 21, 2015, 9 pages.

* cited by examiner

STEERING APPARATUS

TECHNICAL FIELD

The present invention relates to a steering apparatus.

BACKGROUND ART

There are some steering apparatuses for vehicles which include a mechanism for making tilt and telescopic position adjustment of a steering wheel by moving a column that holds a shaft of the steering wheel relative to the body of the vehicle.

A common type of such position adjustment mechanism is configured so as to lock and unlock the column by turning a lever located close to the steering wheel. Since this type of position adjustment mechanism locks and unlocks the column by means of a mechanical transmission mechanism, such as a cam, it easily causes backlash and generates sounds from such backlash.

Under these circumstances, for example, Patent Document 1 discloses the technique of providing a fixed cam with a flexible tab that projects from the fixed cam and causing a frictional force between the flexible tab and a moving cam, thereby reducing backlash and sounds from such backlash upon clamping and releasing with a lever.

CITATION LIST

Patent Document

Patent Document 1: EP1795425 A

SUMMARY

Technical Problem

With the above-described technique, however, the moving cam needs to be pressed against the flexible tab with a high load and it is accordingly difficult to sufficiently reduce backlash or sounds from such backlash. Moreover, the flexible tab may interfere with the movement of the cam and consequently affect the operability of the lever.

The present invention has been made in view of the above-described circumstances and an object of the present invention is to provide a steering apparatus capable of sufficiently reducing backlash and the sounds arising from such backlash which may occur upon position adjustment of a steering wheel, in a simple manner, without affecting the operability of a lever.

Solution to Problem

In order to achieve the above object, the present invention provides a steering apparatus capable of adjusting the position of a steering wheel by moving a column that holds a shaft of the steering wheel relative to a vehicle body, the steering apparatus comprising: a turning lever for locking and unlocking the column relative to the vehicle body; a cam that converts a turning movement of the turning lever into a movement in the axial direction of the turning movement, thereby locking and unlocking the column; and a sleeve that holds the cam and slides with respect to the cam when the turning lever turns, wherein grease is applied to a sliding surface between the sleeve and the cam.

According to the present invention, since the grease is applied to the sliding surface between the sleeve and the cam, it is possible to sufficiently reduce backlash that may occur upon position adjustment of the steering wheel and the sounds from such backlash, in a simple manner without affecting the operability of the lever.

The cam may include a moving cam that rotates together with the turning lever and a fixed cam that moves in the axial direction due to the rotation of the moving cam; the sleeve may slide with respect to the moving cam; and the grease may be applied to such sliding surface between the sleeve and the moving cam.

The sleeve may be configured such that the sleeve is rotationally movable, but is fixed axially, relative to the moving cam while the sleeve is axially movable, but is fixed rotationally, relative to the fixed cam.

The sleeve may be provided with a sliding part that slides with respect to the turning lever or with respect to an intermediary member provided between the turning lever and the sleeve, and grease may be applied to the sliding part.

The turning lever or the intermediary member may have a disk-like part and the sliding part may have a circular-arc shaped groove for fitting the disk-like part therein.

The sleeve may be fixed both axially and rotationally relative to the fixed cam while being movable both axially and rotationally relative to the moving cam.

The sleeve may be integrated with the fixed cam.

The cam may include a moving cam that rotates together with the turning lever and a fixed cam that moves in the axial direction due to the rotation of the moving cam; the sleeve may slide with respect to the fixed cam; and the grease may be applied to such sliding surface between the sleeve and the fixed cam.

The sleeve may be configured such that the sleeve is fixed rotationally, but is axially movable, relative to the moving cam while the sleeve is rotationally movable, but is fixed axially, relative to the fixed cam.

The sleeve may have protrusions that hold both sides of the turning lever therebetween so as to rotationally fix the turning lever with respect to the sleeve.

The fixed cam may have an annular ridge on the outer edge of the fixed cam and the sleeve may have a tab that is fitted with the ridge so as to be rotationally slidable relative to the fixed cam.

Advantageous Effects of Invention

According to the present invention, backlash or sounds from such backlash that may occur upon position adjustment of a steering wheel can be sufficiently reduced in a simple manner without affecting the operability of a lever.

DESCRIPTION OF EMBODIMENTS

Figure 1:
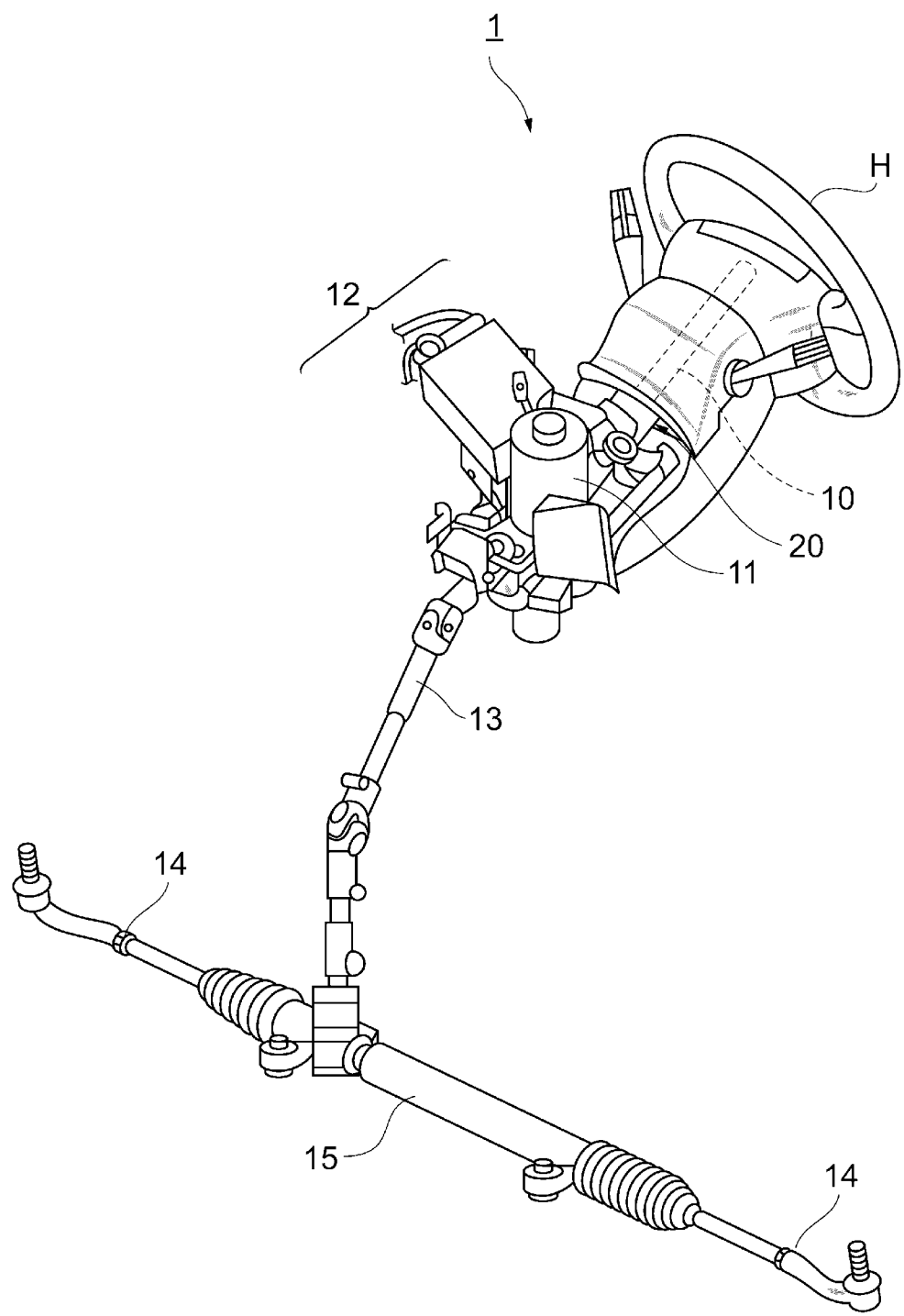
FIG. 1 is a view showing the schematic configuration of a steering apparatus.

Hereinafter, embodiments of the present invention will be described with reference to the attached drawings. In the drawings, unless otherwise specified, the positional relationships, such as up-and-down and right-and-left relationships, are based on those shown in the drawings. Various dimensional ratios shown in the drawings are not limited to those in the drawings. In addition, the below embodiments are just examples for describing the present invention and do not intend to limit the present invention to the described embodiments alone. The present invention can be modified in various ways without departing from the gist of the invention.

FIG. 1 shows an example of the entire configuration of a steering apparatus 1 according to the present embodiment.

For example, the steering apparatus 1 may have: a rotating shaft 10 which is, for example, a steering shaft for transmitting the steering torque applied by a steering wheel H; an electrically assisting mechanism 12 that applies an auxiliary steering torque to the rotating shaft 10 with an electric motor 11; an intermediate shaft 13 which is connected to an output side of the rotating shaft 10 where an auxiliary steering torque has been applied; a tie rod 14 for steering the wheels; and a rack-and-pinion steering gear 15 that transmits the steering force from the intermediate shaft 13 to the tie rod 14.

When a driver operates and rotates the steering wheel H, the rotating force is transmitted to the rotating shaft 10 and the intermediate shaft 13, and further to the tie rod 14 via the steering gear 15, thereby enabling change of a steering angle of the wheels.

The electrically assisting mechanism 12 can apply an auxiliary steering torque to the rotating shaft 10 by driving the electric motor 11 based on the steering torque applied to the rotating shaft 10 by the driver.

The steering apparatus 1 according to the present embodiment is capable of both tilt position adjustment (i.e., up-and-down position adjustment) and a telescopic position adjustment (i.e., back-and-forth position adjustment) of the steering wheel H by moving a column 20 that holds the rotating shaft 10 of the steering wheel H relative to the vehicle body. This tilt and telescopic position adjustment mechanism in the steering apparatus 1 will be described below.

Figure 2:
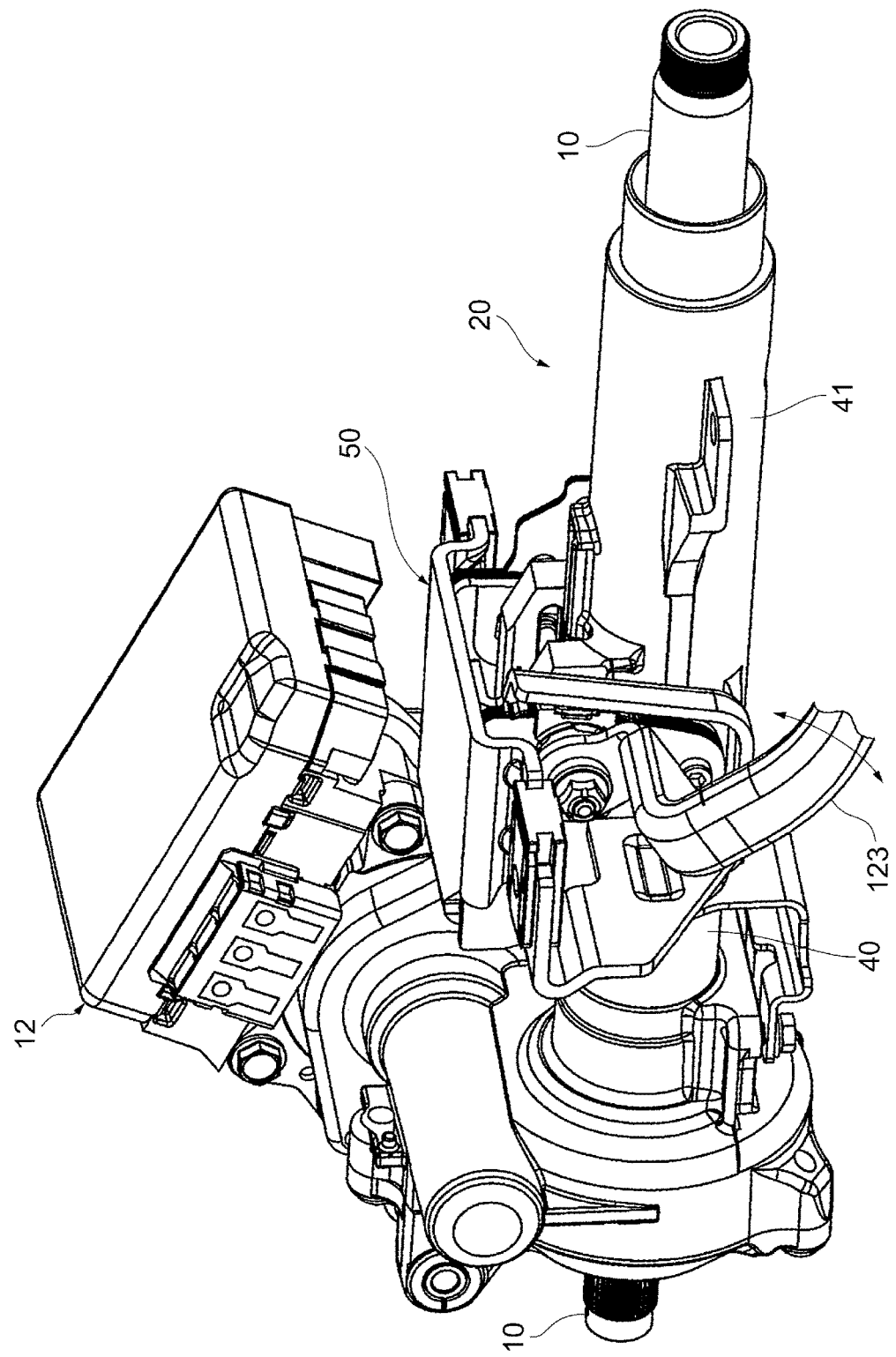
FIG. 2 is a perspective view showing structures around a column of a steering apparatus.

As illustrated in, for example, FIG. 2, the column 20 of the steering apparatus 1 comprises a cylindrical lower column (inner column) 40 that rotatably supports therein the intermediate shaft 13 side of the rotating shaft 10 (i.e., a lower steering shaft) and a cylindrical upper column (outer column) 41 that rotatably supports therein the steering wheel H side of the rotating shaft 10 (i.e., an upper steering shaft).

The upper column 41 is fitted so as to be axially slidable on the outer periphery of the lower column 40 in order to enable telescopic position adjustment.

The upper column 41 is supported by a bracket 50 which is fixed to the vehicle body. As illustrated in, for example, FIGS. 3 and 4, the bracket 50 includes a pair of side plates 60 and 61 for holding both sides of the upper column 41 in the right-and-left direction (the width direction of the vehicle). The side plates 60 and 61 each respectively have long holes 62 and 63, each being formed to pass through the corresponding side plate in the right-and-left direction and to be long in the up-and-down direction.

A pair of right-side and left-side top plates 70 and 71, contacting the inner side of the side plates 60 and 61 of the bracket 50, respectively, is provided on top of the upper column 41. The top plates 70 and 71 each respectively have long holes 72 and 73, each being formed to pass through the corresponding top plate in the right-and-left direction and to be long in the back-and-forth direction.

Figure 3:
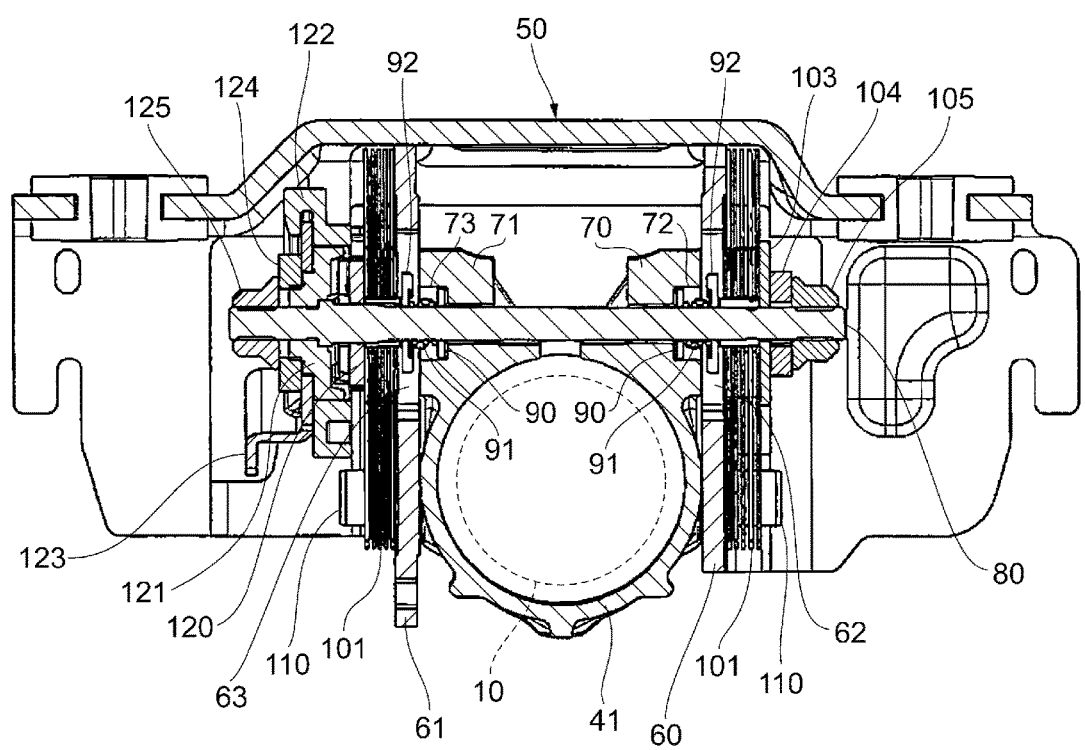
FIG. 3 is an explanatory view showing a longitudinal section illustrating structures around a column.

As illustrated in FIG. 3, in a state in which the upper column 41 is held between the side plates 60 and 61 of the bracket 50, a rod 80 passes in the right-and-left direction through the long holes 62 and 63 in the side plates 60 and 61 of the bracket 50 and through the long holes 72 and 73 in the top plates 70 and 71 of the upper column 41.

Each of the long holes 72 and 73 of the upper column 41 has a larger diameter in its outer side in the right-and-left direction than in its inner side so as to form a large-diameter section, and a cylindrical collar 90 for inserting the rod 80 therein, and a coiled spring 91, are both fitted into such large-diameter section. An inner sleeve 92 is provided on the outer side of the coiled spring 91 along the rod 80. As shown in FIG. 5, the inner sleeve 92 has a larger-diameter flange part 92a and a tubular part 92b, and the flange part 92a is in contact with the coiled spring 91.

Figure 4:
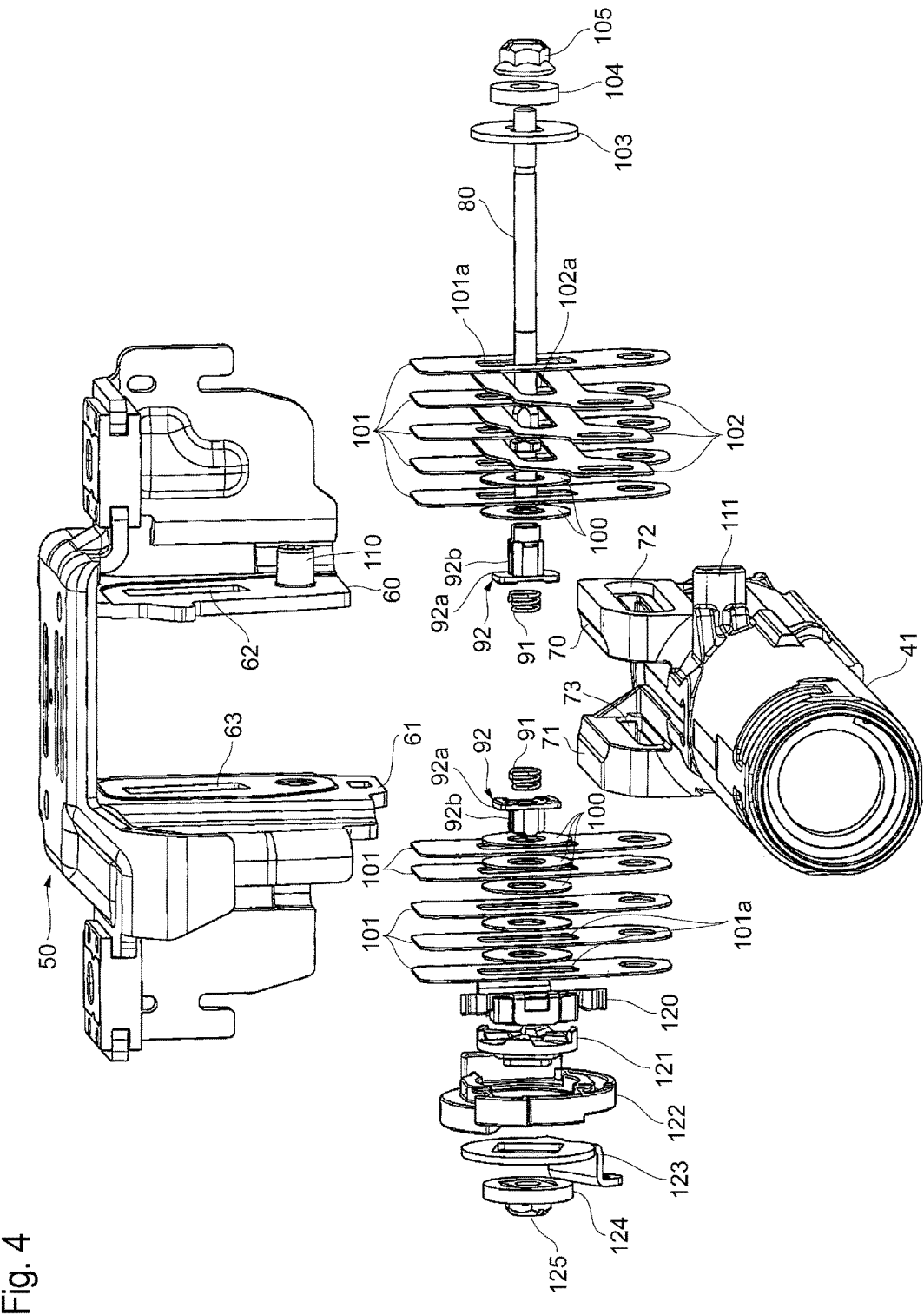
FIG. 4 is an exploded view of structures around a column.

As shown in FIG. 4, on the outer side of the side plate 60 of the bracket 50 (see the right side in each of FIGS. 3 and 4), a plurality of annular thin plates 100, a plurality of friction plates 101 for tilt adjustment, a plurality of friction plates 102 for telescopic adjustment, a presser plate 103, a thrust bearing 104 and a nut 105 are provided along the rod 80. For example, the telescopic adjustment friction plates 102 may each be placed between the tilt adjustment friction plates 101, and the annular thin plates 100 may be placed between the tilt adjustment friction plates 101 and at the inner side of the innermost tilt adjustment friction plate 101.

Figure 5A:
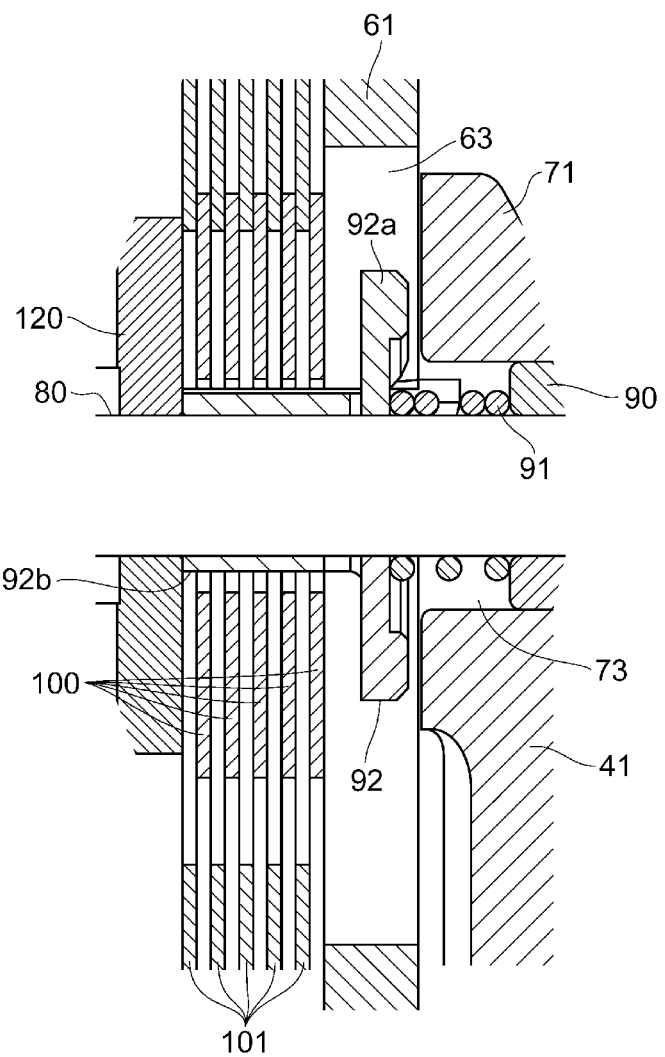
FIG. 5A is an explanatory view showing a longitudinal section illustrating structures around an inner sleeve on the side of a turning lever.
Figure 5B:
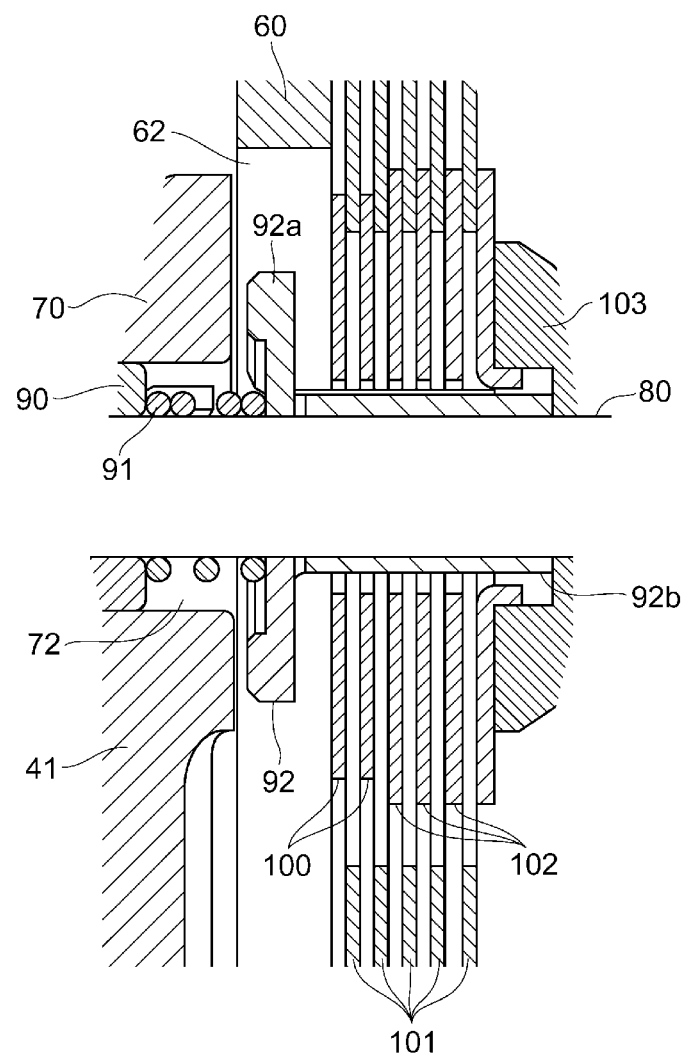
FIG. 5B is an explanatory view showing a longitudinal section illustrating structures around an inner sleeve on the side of a presser plate.

The tilt adjustment friction plates 101 each have a long hole 101a, which is long in the up-and-down direction, and are fixed to a pin 110 which is provided on the side plate 60 of the bracket 50. The telescopic adjustment friction plates 102 each have a long hole 102a, which is long in the back-and-forth direction, and are fixed to a pin 111 which is provided on the upper column 41. As shown in FIG. 5B, the tubular part 92b of the relevant inner sleeve 92 is inserted into the holes of the annular thin plates 100, the long holes 101a of the tilt adjustment friction plates 101, and the long holes 102a of the telescopic adjustment friction plates 102, and an outer end of the tubular part 92b is in contact with the presser plate 103.

On the outer side of the side plate 61 of the bracket 50 (see the left side in each of FIGS. 3 and 4), a plurality of annular thin plates 100, a plurality of tilt adjustment friction plates 101, a fixed cam 120, a moving cam 121, a sleeve 122, a turning lever 123, a washer 124 and a nut 125 are provided along the rod 80, as shown in FIG. 4. The annular thin plates 100 are placed between the tilt adjustment friction plates 101 and at the inner side of the innermost tilt adjustment friction plate 101.

The tilt adjustment friction plates 101 are fixed to a pin 110 provided on the side plate 61 of the bracket 50. As shown in FIG. 5A, the tubular part 92b of the relevant inner sleeve 92 is inserted into the holes of the annular thin plates 100 and the long holes 101a of the tilt adjustment friction plates 101, and an outer end of the tubular part 92b is in contact with the fixed cam 120.

Figure 6:
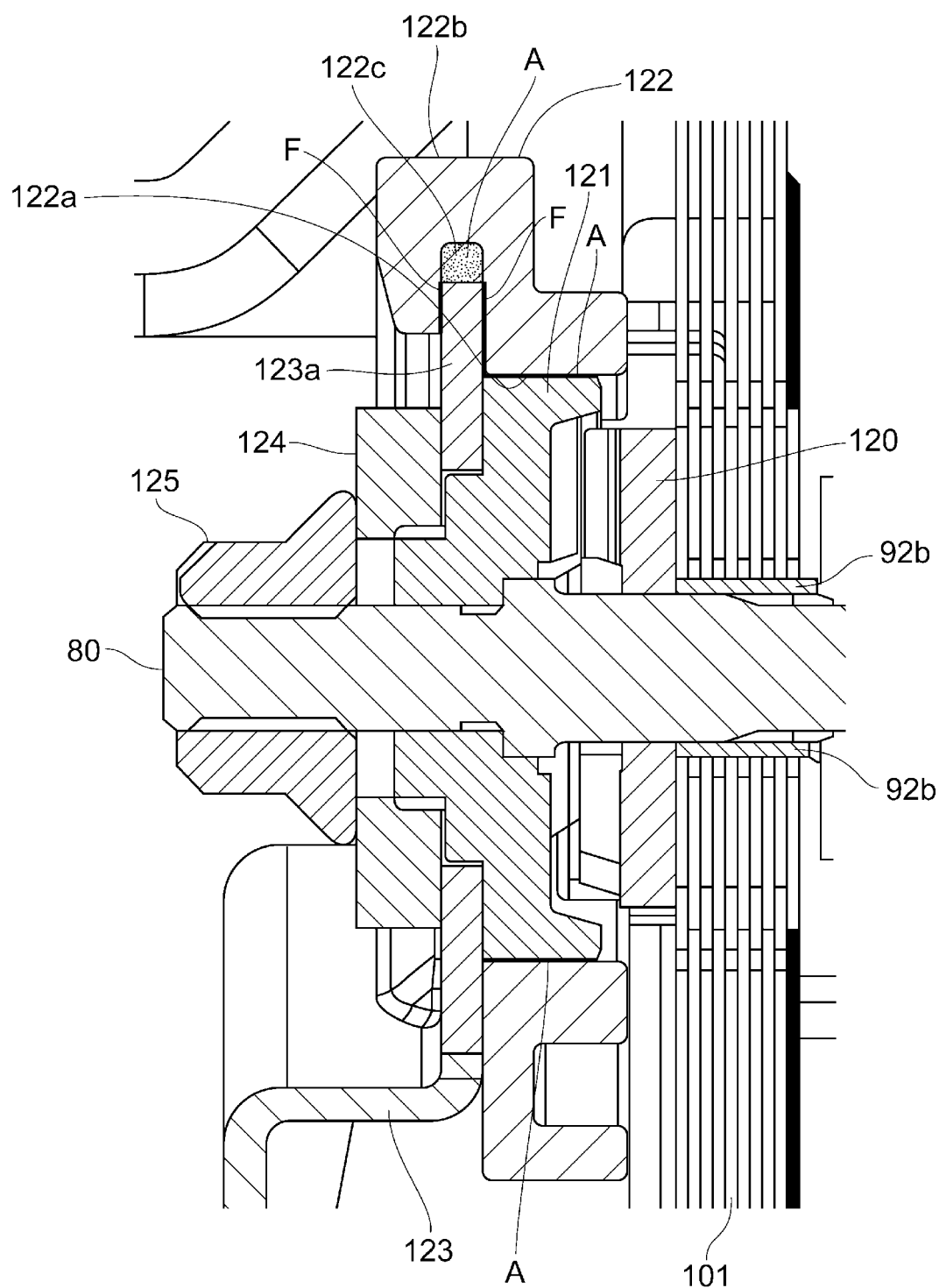
FIG. 6 is an explanatory view showing a longitudinal section illustrating structures around cams.

As shown in FIG. 6, the fixed cam 120 engages with the moving cam 121 at their respective cam surfaces, and the sleeve 122 holds the fixed cam 120 and the moving cam 121 from their respective outer peripheries. The turning lever 123 is fixed to the moving cam 121 and fastened with the washer 124 and the nut 125 from the outside.

Figure 7:
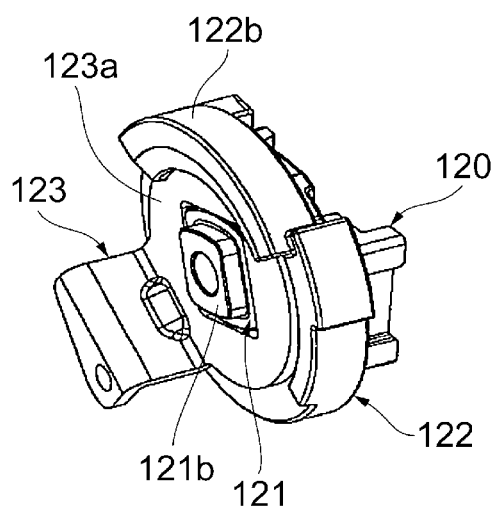
FIG. 7 is a perspective view showing an assembled state of structures around cams.
Figure 8:
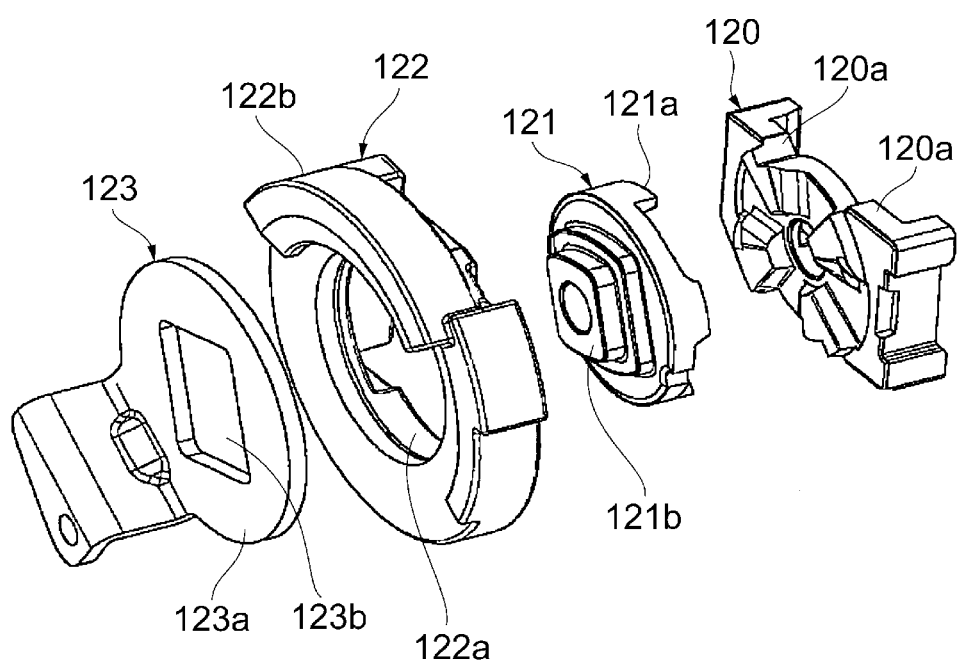
FIG. 8 is an exploded view of structures around cams.

The configuration of the fixed cam 120, the moving cam 121, the sleeve 122 and the turning lever 123 will be more specifically described below. FIG. 7 is an assembled view and FIG. 8 is an exploded view of these components.

The fixed cam 120 is formed in a substantially rectangular shape and has a cam surface (a surface that is in contact with the moving cam 121) axially outward of the rod 80. The moving cam 121 is formed in a substantially disk-like shape having a circular outer periphery, and it has a cam surface on axially inner side of the rod 80. The cam surfaces of the fixed cam 120 and the moving cam 121 each have raised portions and trough portions arranged alternately in the circumferential direction, and when the moving cam 121 rotates relative to the fixed cam 120 and their raised portions are opposed to each other, the fixed cam 120 is pressed toward the upper column 41 (i.e., pressed inwardly) along the rod 80. On the other hand, when the moving cam 121 and the fixed cam 120 engage with each other between the raised portions of one cam and the trough portions of the other cam, the fixed cam 120 moves outwardly back along the rod 80.

For example, the moving cam 121 may have a rotation regulating part 121a that protrudes toward the fixed cam 120, so that the rotation regulating part 121a hits against a stopper 120a of the fixed cam 120 when the moving cam 121 rotates by a predetermined angle, thereby being able to regulate the angle of rotation within a predetermined range. With this configuration, the moving cam 121 rotates relative to the fixed cam 120 between a position where the raised portions of one cam are opposed to the raised portions of the other cam and a position where the raised portions of one cam are opposed to the trough portions of the other cam.

Further, the moving cam 121 may have, for example, a rectangular protrusion 121b formed on a surface on the side of the turning lever 123. The turning lever 123 is formed in an elongated shape, which is easy for the driver to hold, and has a disk-like part 123a at an end thereof. A rectangular hole 123b is formed at the center of the disk-like part 123a. The protrusion 121b of the moving cam 121 is fitted into the hole 123b of the turning lever 123, so that the turning lever 123 and the moving cam 121 turn together.

The sleeve 122 is formed in a substantially ring-like shape. As shown in FIG. 6, the sleeve 122 has an annular recessed part 122a on the side of the moving cam 121, and the moving cam 121 is slidably received in the recessed part 122a. The outer periphery of the moving cam 121 and the inner periphery of the recessed part 122a of the sleeve 122 serve as sliding surfaces and grease A is applied to such sliding surfaces. Examples of such grease A include grease having a kinematic viscosity of 2000 mm$^2$/S or more, and it is preferable to use grease having a kinematic viscosity which is not greatly influenced by a temperature change. It should be noted, however, that grease having a kinematic viscosity equal to or lower than 2000 mm$^2$/s may also be used as the grease A. Further, various types of grease may be used as the grease A, regardless of the degree of influence of a temperature change on the kinematic viscosity of the grease.

The sleeve 122 is rotationally fixed to the fixed cam 120, while being fitted with the fixed cam 120 so as to be axially movable.

As illustrated in FIGS. 6 to 8, the sleeve 122 has, on its surface on the side of the turning lever 123, an engagement part 122b that engages with the disk-like part 123a of the turning lever 123. The engagement part 122b protrudes in a circular-arc form from the outer periphery of the sleeve 122 toward the turning lever 123, and a circular-arc form groove 122c is formed inside the engagement part 122b, as shown in FIG. 6. The disk-like part 123a of the turning lever 123 is rotatably fitted into the circular-arc form groove 122c. A gap F formed between this groove 122c and the disk-like part 123a and between the engagement part 122b and the disk-like part 123a serves as a sliding part, and the grease A is applied to the groove 122c. It should be noted that the grease A applied to the groove 122c may be the same as the grease A applied to the inner periphery (i.e., the sliding surface) of the recessed part 122a of the sleeve 122. Obviously, the grease A applied to the groove 122c may be different from the grease A applied to the sliding surface in the recessed part 122a.

The turning lever 123 is fastened to the sleeve 122 and the moving cam 121 with the washer 124 and the nut 125.

Now, the operation of the tilt and telescopic position adjustment mechanism for the steering wheel H having the above-described configuration will be described. When the turning lever 123 is turned (for example, upward) to a lock position, the moving cam 121 rotates relative to the fixed cam 120 so that the raised portions on the respective cam surfaces are opposed to one another and, as a result, the fixed cam 120 moves (inward) toward the upper column 41 along the rod 80. When the fixed cam 120 moves inward, the fixed cam 120 presses the tilt adjustment friction plates 101, etc. in an inward manner, as shown in FIG. 5A, thereby causing inward elastic deformation of the side plate 61 of the bracket 50.

Further, when the fixed cam 120 moves inward, the rod 80 is pulled toward the turning lever 123, so that the presser plate 103 moves (inward) toward the upper column 41. As a result, as shown in FIG. 5B, the presser plate 103 presses the tilt adjustment friction plates 101, etc. in an inward manner, thereby causing inward elastic deformation of the side plate 60 of the bracket 50.

Consequently, the upper column 41 is strongly held by the side plates 60 and 61 located on both sides of the bracket 50, and the position of the steering wheel H is accordingly locked.

On the other hand, when the turning lever is moved (for example, downward) to an unlock position, the moving cam 121 rotates relative to the fixed cam 120 so that the raised portions and the trough portions on the respective cam surfaces are opposed to each other and, as a result, the fixed cam 120 moves (outward) toward the turning lever 123 due to an urging force of the coiled spring 91. When the fixed cam 120 moves outward, the tilt adjustment friction plates 101, etc., which have been pressed by the fixed cam 120, move outward to their initial positions and the side plate 61 of the bracket 50, which has elastically deformed inwardly, also moves back to its initial position.

Further, when the fixed cam 120 moves outward, the rod 80 also moves in an opposite direction from the turning lever 123. As a result, the presser plate 103, which has pressed the tilt adjustment friction plates 101, etc., moves outward to its initial position and the side plate 60 of the bracket 50, which has elastically deformed inwardly, also moves back to its initial position.

Consequently, the upper column 41 is released from the holding side plates 60 and 61 of the bracket 50 and is allowed to move.

If a force is applied in the up-and-down direction to the steering wheel H in a state where the upper column 41 is released from the holding bracket 50, the upper column 41 moves up and down along the long holes 62 and 63 formed in the side plates 60 and 61 of the bracket 50, thereby enabling tilt position adjustment of the steering wheel H.

If a force is applied to the steering wheel H in the back-and-forth direction, the upper column 41 moves back and forth along the long holes 72 and 73 formed in the top plates 70 and 71 of the upper column 41, thereby enabling telescopic position adjustment of the steering wheel H.

According to the present embodiment, the moving cam 121 slides with respect to the sleeve 122 when the turning lever 123 is turned for position adjustment of the steering wheel H, and grease A is applied to the sliding surface between the moving cam 121 and the sleeve 122. As a result, it is possible to sufficiently reduce backlash that may occur upon position adjustment of the steering wheel H and the sounds from such backlash in a simple manner. In addition, adequate operability of the turning lever 123 can also be obtained.

Furthermore, a circular-arc form groove 122c is formed in the sleeve 122 and the outer periphery of the disk-like part 123a of the turning lever 123 is fitted into such groove 122c so as to form a sliding part, and grease A is applied to the sliding part. Due to this, backlash and the sounds from such backlash can further be reduced. Moreover, for example, the turning lever 123 may sometimes move swiftly upon unlocking; however, the grease A can function like a damper and suppress acceleration of the turning lever 123. As a result, it is possible to prevent the turning lever 123 from hitting strongly against the driver and to also prevent sounds from being generated due to the movement of the turning lever 123.

Figure 9:
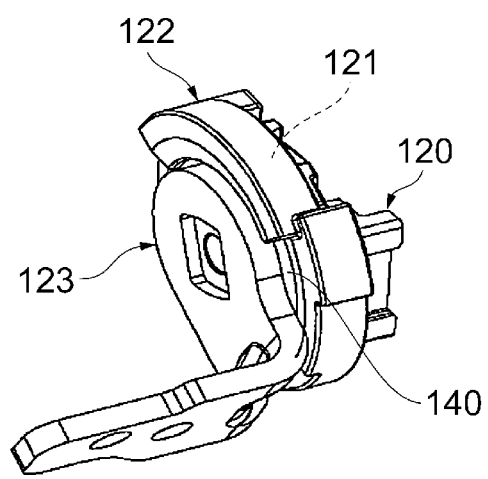
FIG. 9 is a perspective view showing an assembled state of structures around cams, including an intermediary member.
Figure 10:
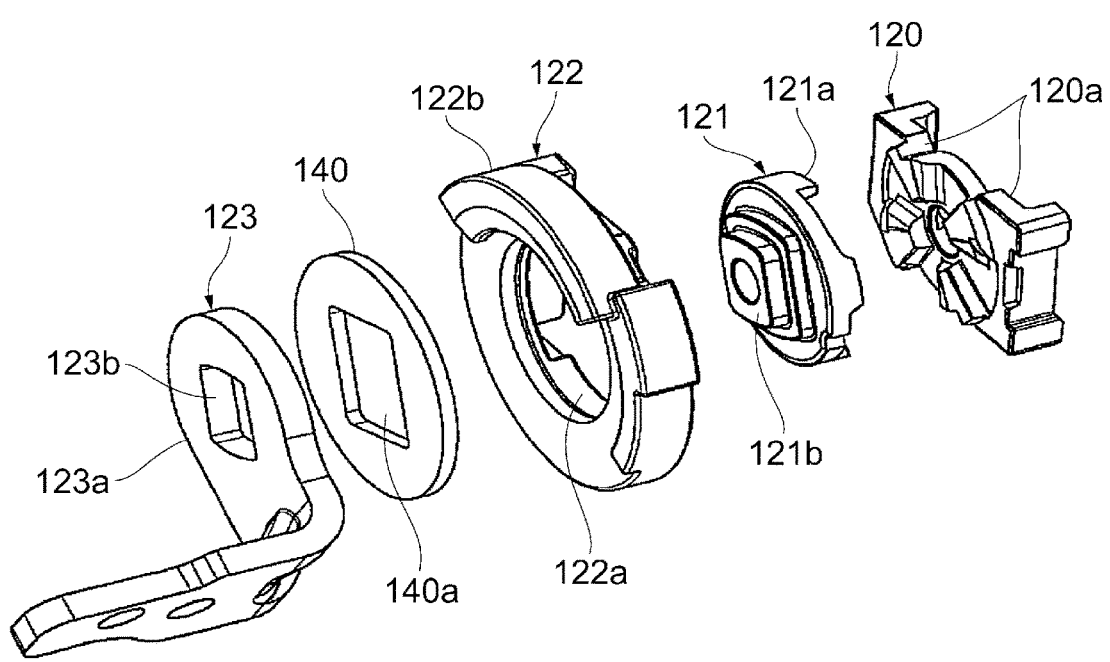
FIG. 10 is an exploded view of the structures around the cams shown in FIG. 9.

In the above-described embodiment, a disk-like intermediary member 140 may be provided between the turning lever 123 and the sleeve 122, as shown in FIGS. 9 and 10. In that case, a hole 140a is formed at the center of the intermediary member 140 and the protrusion 121b of the moving cam 121 is fitted into the hole 140a. Meanwhile, the intermediary member 140 is fitted into the circular-arc form groove 122c of the sleeve 122 and grease A is applied between the groove 122c and the intermediary member 140. In this configuration as well, backlash that may occur upon position adjustment of the steering wheel H and the sounds from such backlash can be sufficiently reduced in a simple manner. In addition, adequate operability of the turning lever 123 can also be obtained.

In the above-described embodiment, the sleeve 122 is configured such that it is movable in the rotational direction, but is fixed in the axial direction of the rod 80, relative to the moving cam 121 while it is movable in the axial direction, but is fixed in the rotational direction, relative to the fixed cam 120; however, the sleeve 122 may be fixed relative to the fixed cam 120 in both the axial direction of the rod 80 and the rotational direction while being movable relative to the moving cam 121 in both the axial direction and the rotational direction.

Figure 11:
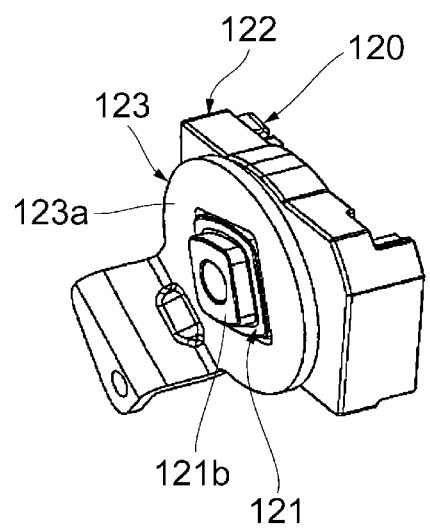
FIG. 11 is a perspective view showing an assembled state of another form of structures around cams.
Figure 12:
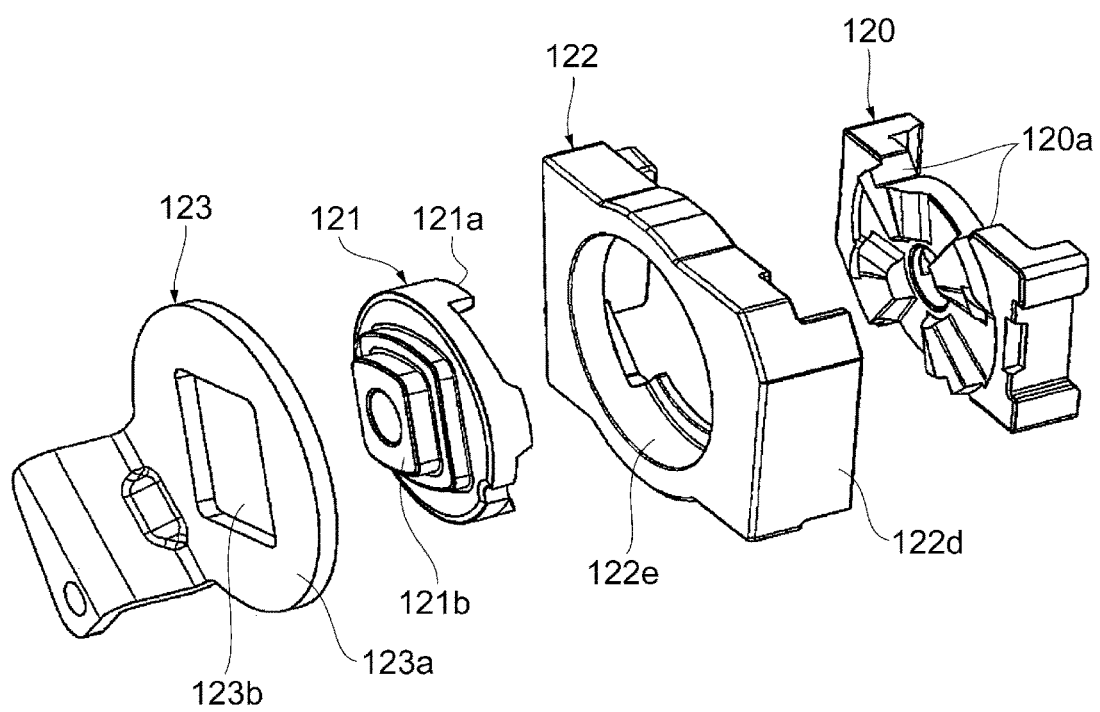
FIG. 12 is an exploded view of the structures around the cams shown in FIG. 11.

In the above case, the sleeve 122 has a fixation cover 122d, for example, on its side surface for fixing the sleeve 122 relative to the fixed cam 120 both rotationally and axially, as shown in, for example, FIGS. 11 and 12. Further, the sleeve 122 has an inner periphery 122e having the same diameter as that of the outer periphery of the moving cam 121 so as to make the moving cam 121 slidable both rotationally and axially. Grease A is applied to the sliding surface between the sleeve 122 and the moving cam 121. When the turning lever 123 is turned in this configuration, the moving cam 121 rotates and, in response to such rotation, the fixed cam 120 and the sleeve 122 integrally move in the axial direction of the rod 80. In this configuration as well, backlash that may occur upon position adjustment of the steering wheel H and the sounds from such backlash can be sufficiently reduced in a simple manner. In addition, adequate operability of the turning lever 123 can also be obtained. Moreover, the sleeve 122 also slides axially with respect to the moving cam 121 and grease A is applied to such sliding surface; accordingly, a damper-like effect for the turning lever 123 can also be obtained.

Figure 13:
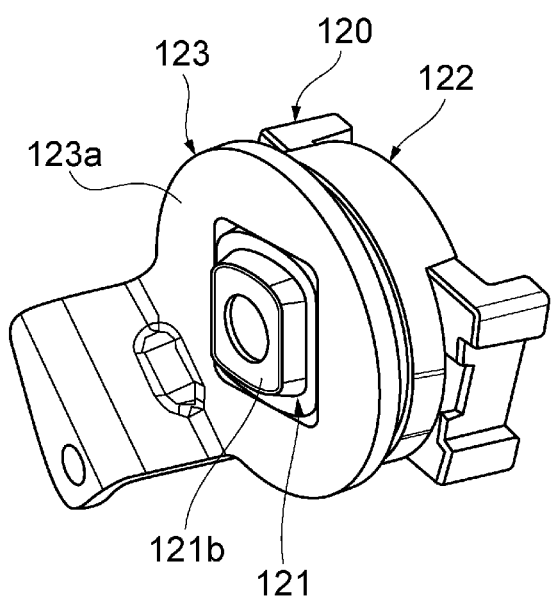
FIG. 13 is a perspective view showing an assembled state of structures around cams in which a sleeve is integrated with a fixed cam.
Figure 14:
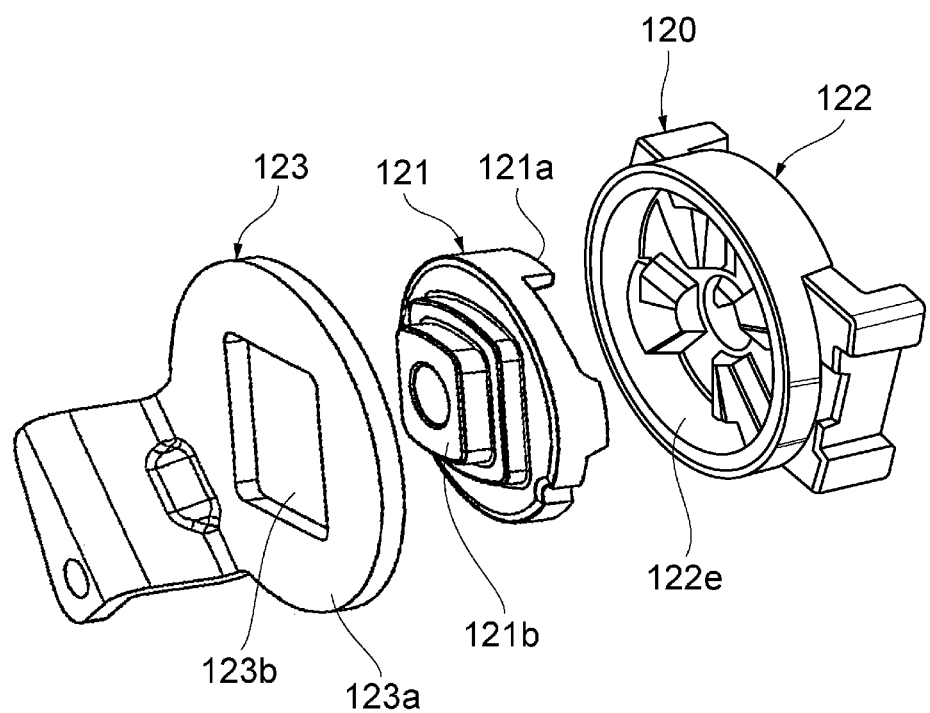
FIG. 14 is an exploded view of the structures around the cams shown in FIG. 13.

In the above embodiment, the sleeve 122 may be formed integrally with the fixed cam 120, as shown in FIGS. 13 and 14.

It should be noted that, in the above-described embodiments, the sleeve 122 slides with respect to the moving cam 121, but the sleeve 122 may slide with respect to the fixed cam 120 and grease may be applied to such sliding surface. In that case, the sleeve 122 may be fixed relative to the moving cam 121 in both the axial direction of the rod 80 and the rotational direction while being movable relative to the fixed cam 120 in both the axial direction and the rotational direction. Furthermore, the sleeve 122 in the above case may be formed integrally with the moving cam 121.

An example in which the sleeve 122 slides with respect to the fixed cam 120 and grease A is applied to the corresponding sliding surface will be described next.

Figure 15:
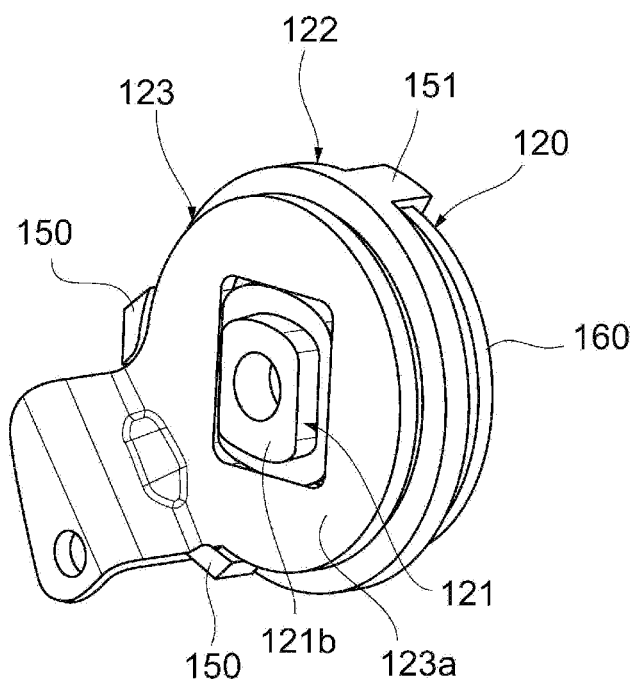
FIG. 15 is a perspective view showing an assembled state of structures around cams in which a sleeve slides with respect to a fixed cam.
Figure 16:
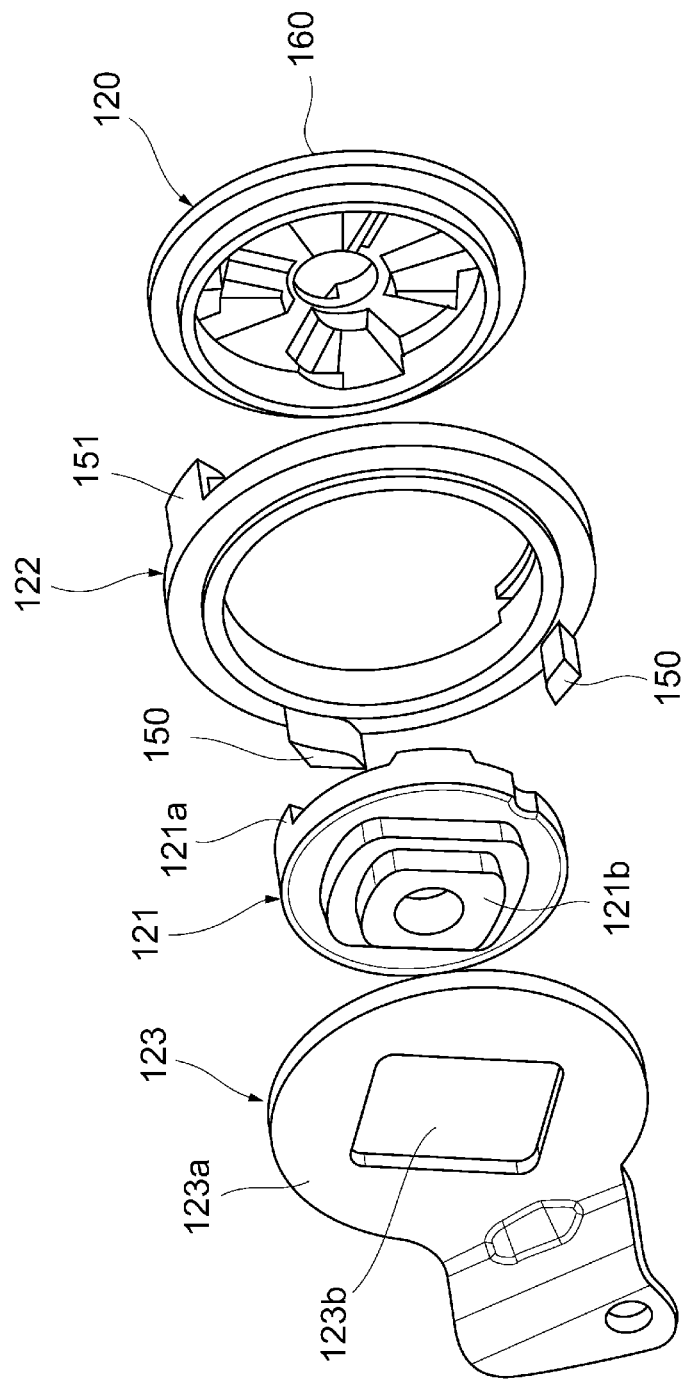
FIG. 16 is an exploded view of the structures around the cams shown in FIG. 15.
Figure 17:
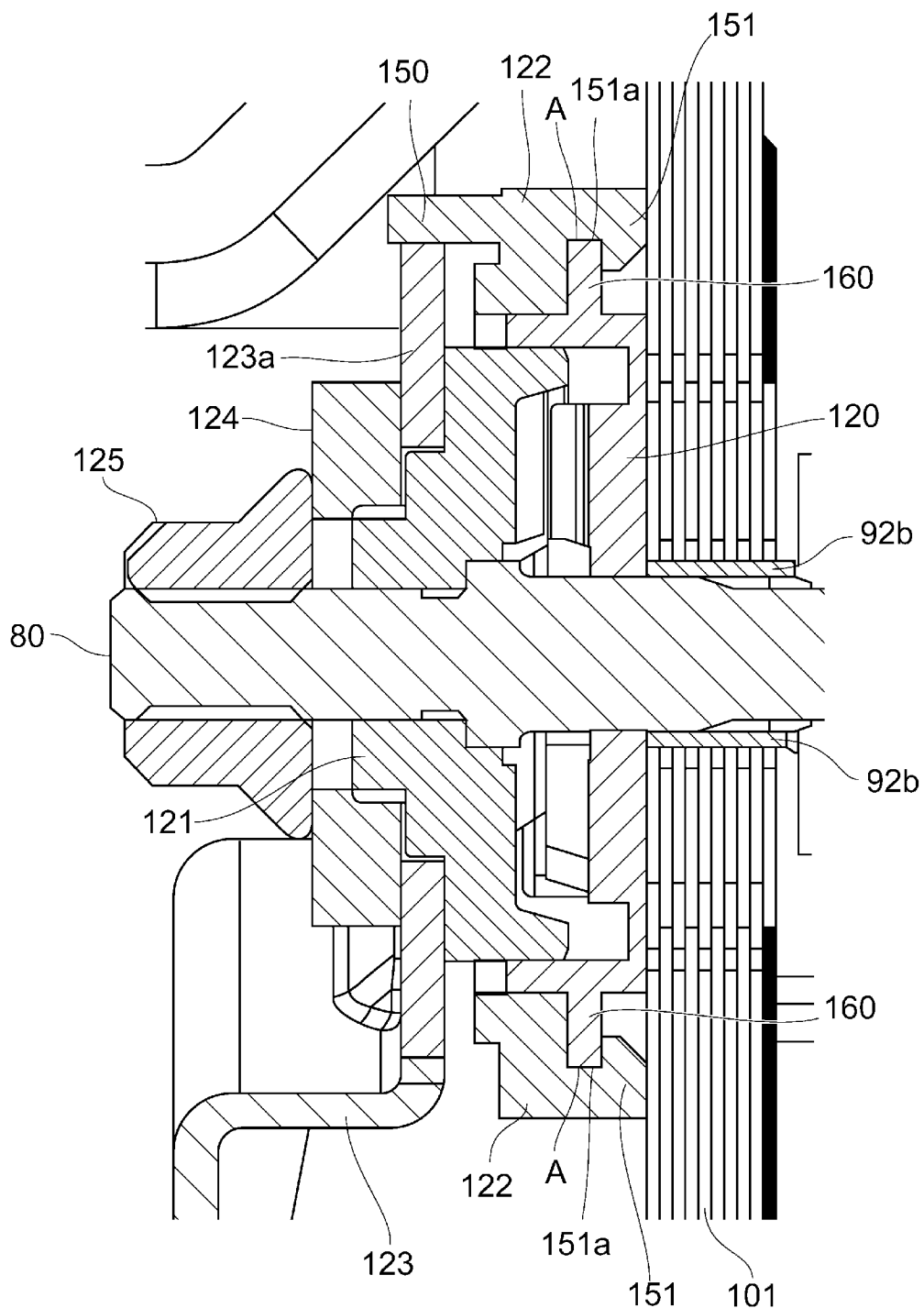
FIG. 17 is an explanatory view showing a longitudinal section illustrating structures around cams.

FIG. 15 shows an assembled state of the structures around the cams in the case where the sleeve 122 slides with respect to the fixed cam 120, FIG. 16 shows an exploded view of such structures around the cams, and FIG. 17 shows a state in which such structures around the cams have been attached to the steering apparatus 1.

For example, the turning lever 123, the moving cam 121, the sleeve 122 and the fixed cam 120 may be arranged in this order, as shown in FIG. 16.

The sleeve 122 is formed in an annular shape having a larger diameter than the outer diameter of the moving cam 121, and it receives the moving cam 121 on its inner periphery.

The sleeve 122 has a pair of projections 150 formed on a surface which is on the side of the turning lever 123. As shown in FIG. 15, the projections 150, when assembled, hold both sides of the turning lever 123 therebetween so as to rotationally fix the turning lever 123 with respect to the sleeve 122. As a result, when the turning lever 123 is turned, the sleeve 122 is synchronously turned. Since the moving cam 121 is fitted with the turning lever 123 and turns together with the turning lever 123, the turning lever 123, the moving cam 121 and the sleeve 122 are rotationally fixed with respect to each other and turn together. It should be noted that the turning lever 123 and the moving cam 121 are not fixed axially relative to the sleeve 122 and they are therefore axially movable.

The sleeve 122 has a plurality of tabs 151 formed on a surface which is on the side of the fixed cam 120. As shown in FIG. 17, a groove 151a is formed inside each tab 151.

As shown in FIG. 15, the fixed cam 120 may have, for example, a disk-like shape and an annular ridge 160 may be formed on the outer edge thereof so that the tabs 151 of the sleeve 122 can be fitted with the ridge 160. This ridge 160 may be molded integrally with the fixed cam 120 or they may be molded separately from each other. As shown in FIG. 17, the ridge 160 is fitted into the grooves 151a of the tabs 151 so as to be rotationally slidable. Accordingly, the sleeve 122 is rotationally movable but fixed axially with respect to the fixed cam 120. Further, the inner periphery of the tabs 151 of the sleeve 122 and the ridge 160 of the fixed cam 120 serve as a sliding surface and grease A is applied to the sliding surface.

In the above example, when the turning lever 123 is turned for position adjustment of the steering wheel H, the moving cam 121 and the sleeve 122 turn synchronously with the turning lever 123 and the sleeve 122 slides with respect to the fixed cam 120. Since grease A is applied to the sliding surface between the fixed cam 120 and the sleeve 122, backlash that may occur upon position adjustment of the steering wheel H and the sounds from such backlash can be reduced. In addition, adequate operability of the turning lever 123 can be obtained.

Preferred embodiments of the present invention have been described above with reference to the attached drawings, but the present invention is not limited to these examples. A person skilled in the art could obviously think of various modifications and alterations within the idea specified in the scope of the claims and it should be appreciated that such modifications and alterations would obviously be encompassed within the technical scope of the present invention.

For example, the configuration of the mechanism for tilt and telescopic position adjustment of the steering wheel H in the above-described embodiments is not limited thereto and the present invention can be applied to other known configurations involving a telescopic structure. For example, the turning lever 123 may have a different configuration, as long as it is a turning member for locking and unlocking the column relative to the vehicle body. The cams 120 and 121 may also have different configurations, as long as they are members for converting the turning movement of the turning lever 123 into a movement in the axial direction of the turning movement so as to accordingly lock and unlock the column. The sleeve 122 may also have a different configuration, as long as it is a member that holds the cams 120 and 121 and slides with respect to the cams 120 and 121 when the turning lever 123 turns. Other than the above, the column 20, the bracket 50, and other elements may also have other configurations. Moreover, the steering apparatus 1 need not be an apparatus capable of both tilt position adjustment and telescopic position adjustment, and the steering apparatus 1 may be an apparatus capable of either one of these adjustments. In addition, the present invention can also be applied to position adjustment of the steering wheel other than the tilt and telescopic position adjustments.

REFERENCE SIGNS LIST

1 Steering apparatus
10 Rotating shaft
20 Column
40 Under column
41 Upper column
50 Bracket
80 Rod
120 Fixed cam
121 Moving cam
122 Sleeve
123 Turning lever
A Grease
H Steering wheel

What is claimed is:

1. A steering apparatus capable of adjusting a position of a steering wheel by moving a column that holds a shaft of the steering wheel relative to a vehicle body, the steering apparatus comprising:
   a turning lever for locking and unlocking the column relative to the vehicle body;
   a cam that converts a turning movement of the turning lever into a movement in an axial direction of the turning movement, thereby locking and unlocking the column; and
   a sleeve that holds the cam and slides with respect to the cam when the turning lever turns, wherein:
   grease is applied to a sliding surface between the sleeve and the cam;
   the cam includes a moving cam that rotates together with the turning lever and a fixed cam that moves in the axial direction due to the rotation of the moving cam;
   the sleeve slides with respect to the moving cam and the grease is applied to a sliding surface between the sleeve and the moving cam; and
   the sleeve is rotationally movable, but is fixed axially, relative to the moving cam while the sleeve is axially movable, but is fixed rotationally, relative to the fixed cam.

2. The steering apparatus according to claim 1, wherein the sleeve has a sliding part that slides with respect to the turning lever or slides with respect to an intermediary member provided between the turning lever and the sleeve, and grease is applied to the sliding part.

3. The steering apparatus according to claim 2,
   wherein the turning lever or the intermediary member has a disk-like part, and
   wherein the sliding part has a circular-arc form groove for fitting the disk-like part therein.

4. A steering apparatus capable of adjusting a position of a steering wheel by moving a column that holds a shaft of the steering wheel relative to a vehicle body, the steering apparatus comprising:
   a turning lever for locking and unlocking the column relative to the vehicle body;
   a cam that converts a turning movement of the turning lever into a movement in an axial direction of the turning movement, thereby locking and unlocking the column; and
   a sleeve that holds the cam and slides with respect to the cam when the turning lever turns, wherein:
   grease is applied to a sliding surface between the sleeve and the cam;
   the cam includes a moving cam that rotates together with the turning lever and a fixed cam that moves in the axial direction due to the rotation of the moving cam;
   the sleeve slides with respect to the moving cam and the grease is applied to a sliding surface between the sleeve and the moving cam; and the sleeve is fixed both axially and rotationally relative to the fixed cam while the sleeve is movable both axially and rotationally relative to the moving cam.

5. The steering apparatus according to claim 4, wherein the sleeve is integrated with the fixed cam.

6. A steering apparatus capable of adjusting a position of a steering wheel by moving a column that holds a shaft of the steering wheel relative to a vehicle body, the steering apparatus comprising:
- a turning lever for locking and unlocking the column relative to the vehicle body;
- a cam that converts a turning movement of the turning lever into a movement in an axial direction of the turning movement, thereby locking and unlocking the column; and
- a sleeve that holds the cam and slides with respect to the cam when the turning lever turns, wherein:
- grease is applied to a sliding surface between the sleeve and the cam;
- the cam includes a moving cam that rotates together with the turning lever and a fixed cam that moves in the axial direction due to the rotation of the moving cam;
- the sleeve slides with respect to the fixed cam and the grease is applied to a sliding surface between the sleeve and the fixed cam; and
- the sleeve is rotationally fixed, but is axially movable, relative to the moving cam while the sleeve is rotationally movable, but is fixed axially, relative to the fixed cam.

7. The steering apparatus according to claim 6, wherein the sleeve has protrusions that hold both sides of the turning lever therebetween so as to rotationally fix the turning lever with respect to the sleeve.

8. The steering apparatus according to claim 6 or 7, wherein the fixed cam has an annular ridge on an outer edge of the fixed cam, and
wherein the sleeve has a tab that is fitted with the ridge so as to be rotationally slidable relative to the fixed cam.

* * * * *